United States Patent [19]
Wagenknecht

[11] 3,805,372
[45] Apr. 23, 1974

[54] METHOD OF MANUFACTURING LARGE ROTATABLE MEMBERS BY WELDING

[75] Inventor: Walter E. Wagenknecht, Bochum, Germany

[73] Assignee: Fried. Krupp Huttenwerke AG

[22] Filed: Dec. 14, 1971

[21] Appl. No.: 207,833

[30] Foreign Application Priority Data
Dec. 16, 1970  Germany............................ 2062894

[52] U.S. Cl..................... 29/481, 29/475, 29/482, 29/497, 219/57, 219/58
[51] Int. Cl............................................. B23k 31/02
[58] Field of Search............ 219/56, 57, 58; 29/475, 29/482, 480, 481, 497

[56] References Cited
UNITED STATES PATENTS
2,556,160  6/1951  Ayers............................... 29/480 X
3,103,066  9/1963  Harman............................ 29/497 X
3,406,444  10/1968  Parker et al.......................... 29/482

*Primary Examiner*—Richard B. Lazarus
*Attorney, Agent, or Firm*—Eric H. Waters

[57] ABSTRACT

A method of producing large rotatable steel parts with circular cross-sections for construction of large machines such as shafts of generators and turbines. In a first stage a welding process is effected under a welding head for production of a weld connection in the central region of a welding gap between the parts. This central weld is subsequently circularly machined and the remaining peripheral groove is widened and formed of V shape. The parts are then welded at the groove, while the parts are rotated, by use of a welding process with a granulated welding flux.

9 Claims, 7 Drawing Figures

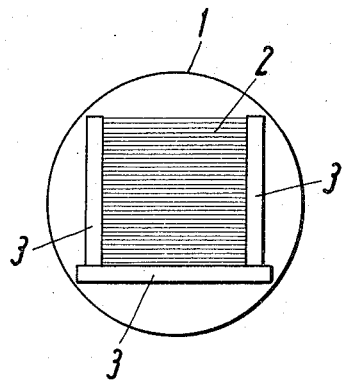
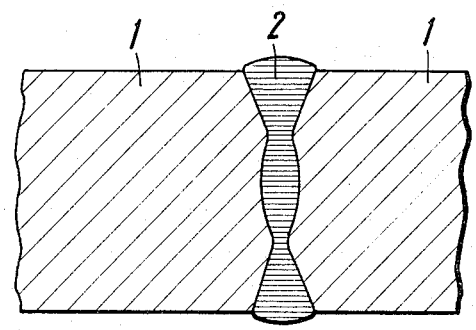
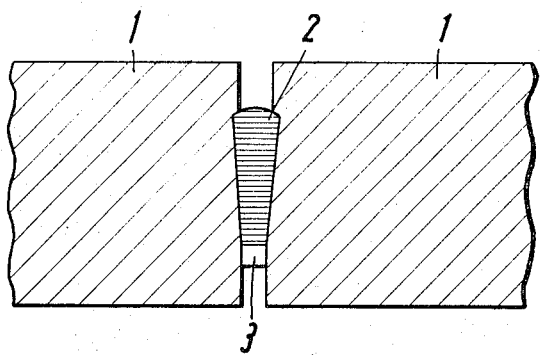
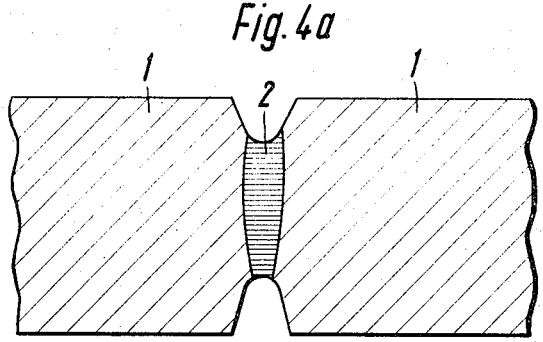

METHOD OF MANUFACTURING LARGE ROTATABLE MEMBERS BY WELDING

BACKGROUND OF THE INVENTION

1. Field of the Invention

The invention relates to the manufacture of large parts of machines which undergo rotation and particularly to the manufacture of generator and turbine shafts by welding procedures.

2. Description of the Prior Art

Large machine parts, particularly parts to be used in the manufacture of generators and turbines, are generally produced in one piece as a monobloc, if the technical capability and economic considerations permit the same. This means that very heavy blocks or ingots of raw materials must be forged, considering that metal waste and working allowance must be taken into account. Consequently, the size of parts to be forged, which have rapidly increased over the last few years, have imposed considerable burdens on steel mills and metal workers, as the available machinery is generally not suitable for handling such heavy parts. Additionally, the number of metallurgical problems increases with increasing size.

The conditions and relations are thoroughly described in the literature, for instance, in Brown-Boveri-Mitteilungen (Brown-Boveri Information) No. 8 (1969), pages 376–379 and pages 394–415, and "BBC-Nachrichten" (BBC News) 1965, pages 277–283. These publications also refer to other possible methods for instance, the possibility of welding the turbine rotors from discs and shaft ends, and the possibility of manufacturing generator shafts as products of mechanical shrinkage processes, (see in the BB1 publication, page 396 on the right and FIG. 7 on page 397). However, certain limitations must be accepted when using the above methods. Up to now, the welding operation is effected in such a manner that annular surfaces are welded together, and the root welding zones are very hard to produce. A shrinking construction of the generator shafts is very expensive, and, moreover, requires the provision of a longitudinal bore of such size as to render the product of doubtful strength.

It is desirable that the body not have a bore in order to reduce the mechanical stresses in the body and also for reasons of the ferromagnetic flux.

Welding together a body having a large cross-section without providing a bore therein as in conventional methods, encounters many difficulties, since most of the time it is not possible to ensure to a sufficient degree of reliability that the root welding zone located in the center of the ingot is free from defects. Furthermore, this method requires that the weld width increases from the axis of the forgeable ingot to its outer surface, which results in consumption of very large amounts of welding material. Referring to FIG. 1, therein are shown the forgeable ingots or parts 1 to be welded together and 2 is the welding seam.

A newer welding method, welding under a welding arc or plasma, has the advantage, when compared with the above method, of high density of the weld in the core and of a substantially reduced amount of the welding material to be supplied to the welding apparatus. However, as a result of the increasing heating of the parts to be welded together during the continuing welding of the same, an increased amount of the material of the parts to be welded together melts so that the finished welded connection is not rotationally symmetrical in relation to the axis of rotation of the forgeable ingot, as evident from FIGS. 2a and 2b. The rotational symmetry, however, is one of the most important requirements for a forgeable ingot to be used for manufacturing a rotor, since, if this is not achieved, the rotor is subjected to forces which cause the same to bend during operation and even during the rotation test under increased temperature conditions (Stahl-Eisen-Pruefblatt (steel-iron testing sheet) 1950). Such bending renders the rotor unusable.

SUMMARY OF THE INVENTION

An object of the invention is to provide a method which obviates the above deficiencies associated with the prior art.

The invention contemplates a method for manufacturing large steel pieces with circular cross-sections for the construction of large machines such as, for instance, shafts for generators and turbines, in which a perfect welding root zone is produced in the center of the surfaces to be welded together by a welding operation, and then a narrow weld is formed between the parts in the region of the outer surface and the resulting welded connection has rotational symmetry.

According to the invention, this objective is achieved in such a manner that the welding under the welding plasma arc with shielding is used only for production of a weld in the center region of the parts being welded, and, subsequently, the resulting central welding seam is concentrically machined and the remaining unwelded groove is widened so as to form a V-shaped recess which is subsequently welded using a welding process with a granulated welding flux with rotation of the welded piece. The weld groove or gap is formed in such a manner, that elements are welded together whose adjoining surfaces are parallel or approximately parallel to each other at least in the region of the center of the weld.

BRIEF DESCRIPTION OF THE DRAWING

FIG. 3a is an end view of one of the welded articles in a first stage according to the invention;

FIG. 3b is a side view of the welded articles;

FIG. 4a is a side view of the welded articles in a subsequent stage according to the invention; and FIG. 4b is a side view of the finished welded article according to the invention.

DETAILED DESCRIPTION

Figure 1:
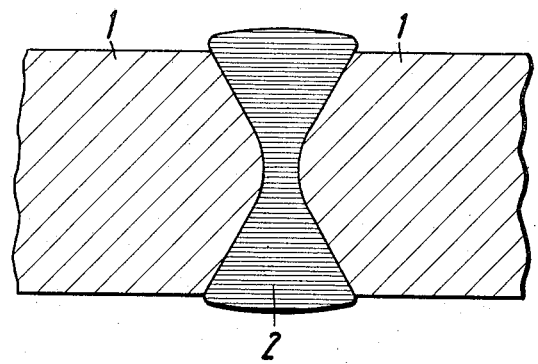
FIG. 1 is a side view of a welded assembly according to the prior art.
Figure 2A:
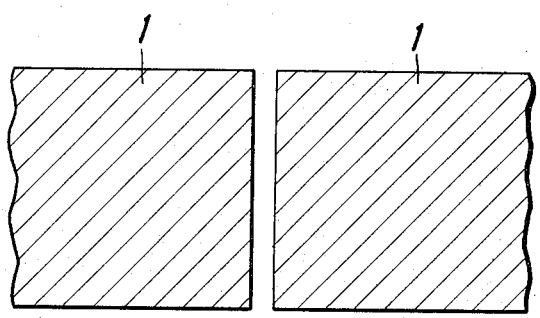
FIG. 2a is a side view which shows the articles to be joined.
Figure 2B:
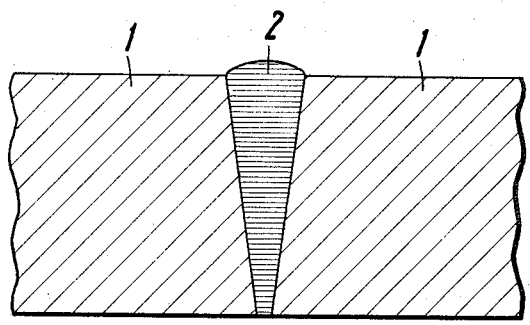
FIG. 2b shows the articles of FIG. 2a after welding has proceeded.

The parts or articles 1 to be joined to each other are arranged so that the parallel surfaces to be welded together are adjacent each other with a slight spacing therebetween as shown in FIG. 3a. Their spacing is obtained by insertion of square-section rods 3 below and on both sides of the weld zone so as to define the same. The weld zone is a hollow space in which the parts are subsequently welded in accordance with a welding process under the welding arc, the weld being formed from bottom to top as shown in FIG. 3b. After cooling of the assembly, the parts 1, which are now rigidly welded together, and the connecting welding seam 2 thereof, are turned e.g., in a lathe to remove excess material as shown in FIG. 4a. Thereafter, the V-shaped groove 2 is rotationally welded in a subsequent welding step in accordance with a welding process under granulated welding flux i.e. submerged are welding to arrive at the joint as shown in FIG. 4b. Advantageously, an annealing operation for removal of inner stresses is effected if the parts have been hardened and tempered before the welding operation, or a complete heat treatment is effected, i.e., hardening and tempering of the entire welded assembly.

In this manner, the welding connection is completely compact in the central region, which is subject to high stresses, to a high degree of reliability. An intermediate examination by ultrasonic sound investigation may be used after the first welding operation. The rotating second welding seam is then entirely rotationally symmetrical.

The symmetry of the outer welding seam has a decisive influence on the stability during the running-in test and during the operation of the shaft, so that any varying melting of the adjoining parts occurring during the welding process under the welding arc in the central region (which can occur only to a limited degree corresponding to the comparatively small size of this first welding joint) can be disregarded.

Even through the invention is of a particular importance for rotatable parts of large machines without a central bore, the welded machine part can also be provided with a bore if desired.

The process according to the invention removes the limitations of the conventional technique for parts used in the construction of large machines, or which might be otherwise expected in a short period of time. In accordance with this, reference is made in particular, to the "Brown-Boveri" publication, page 376 right column, and page 396, right column.

The utilization of the invention extends primarily to diameters of more than 800 mm. preferably above 1,000 mm. There is actually no upper limit set for the utilization of this invention; however for practical purposes, an upper limit of up to 1,800 mm is established.

Welding materials, whose composition is similar to that of the pieces to be welded together, must preferably be used for the shafts of generators, whereas welding materials different from the basic material can be used for welding together the shafts of turbines.

Hereafter, the invention will be explained in greater detail, reference being had to an example of one embodiment:

Two cylindrical halves of a shaft of a generator having an outer ingot diameter of 1,050 mm and made of CrNiMoV steel (C-0.30%; Si-0.32%, Mn-0.50%, P-0.011%, S-0.015%; Cr-1.23%; Mo-0.41%, Ni-1.19%; V-0.10%; the rest being iron) are formed with planar front or welding surfaces. Subsequently, both halves of the shaft are mounted with their front or welding surfaces facing each other, with a spacing of 30 mm between them. This spacing was obtained by interposition between parts 1 of rolled rods of standard steel USt 34-1 (not alloyed) and having approximately 0.15 percent carbon. One rod was arranged in the lower region between the parts extending horizontally and two additional rods were inserted vertically on both sides of the lower rod in such a manner that the minimum distance between the axis of the rotor halves and the rods was 275 mm.

The space formed in this manner and closed from the bottom and on the sides, was welded continuously from the bottom upwardly by means of an automatic welding machine, wherein the welding wire material corresponded to the material of the rotor halves as far as the alloy was concerned, but the carbon content was lower, amounting to 0.26 percent, and the Mn content was 0.79 percent. In order to produce a suitable slag, a ground granulated welding powder was added, which was supplied by the firm Kjellberg-Saab, Soligen-Germany, having the trademark "OK-Flux 5".

After the welding advanced to such a degree that an approximately rectangular welding cross-section has been achieved, the welding process was terminated and a partial annealing operation was effected for removal of inner stresses; the annealing operation was carried out on a running-in bench, the temperature being 620°C.

After the cooling of the assembly, the approximately rectangular welding connection was turned on a lathe, and the rolled rods were machined away. A central weld was formed to a diameter of 500 mm in such a manner that the resulting annular groove diverges outwardly and has a width of 40 mm at its inner base and a width of 110 mm on its outer edge. The edges at the inner base were slightly rounded as shown in FIG. 4a. A subsequent test by ultrasonic sound waves taken at the bottom of the annular groove in all directions did not show any undue flaws, the ultrasonic sound permeability of the weld being sufficient to permit thorough examination.

The first stage of the welding operation of both rotor halves was accomplished successfully. The workpiece was then positioned in an apparatus similar to a lathe and slowly heated to 280°C in the region of the welding zone with simultaneous rotation. Subsequently, the annular groove was welded in accordance with a submerged arc welding process under granulated welding flux, the workpiece being further rotated, and the temperature being held close to a temperature of 280°C to complete the welding operation.

Finally, a tempering treatment and a treatment for removal of inner stresses was carried out on a running-in bench, the entire welded assembly being subject to the treatment, the temperature being 620°C. A subsequent test by ultrasonic sound waves conducted in the region of welding after cooling and machining of the workpiece showed satisfactory results. A rotational test under conditions of increased temperature to 450°C showed no inadmissible inclination of the rotor to create an eccentricity dependent on the temperature. The Brinell hardness was just slightly lower in the region of the weld than in the region of the parts welded together, the tempering temperature of the basic material having been 640°C.

I claim

1. A method of welding two cylindrical steel members to form a welded shaft of circular cross-section, said method comprising mounting the members to be welded in opposed, spaced, coaxial relation, welding the parts in a core region thereof by an electro-slag welding operation to provide a core weld which unites the two steel members and is surrounded by a groove, machining the parts in said groove concentrically with respect to the axis of the members to widen said groove uniformly radially outwards of said axis and to leave a circular core weld between said parts and thereafter filling the thus widened groove by effecting an annular weld between the parts by a submerged arc welding operation while rotating said parts around said axis.

2. A method as claimed in claim 1 wherein the coaxially mounted cylindrical parts have planar faces perpendicular to said axis.

3. A method as claimed in claim 1 wherein said peripheral groove is formed of V-shape and diverges radially outwardly from the axis of rotation.

4. A method as claimed in claim 2 comprising mounting rods between said planar faces of the parts to establish the gap therebetween and form a bottom and side boundaries for said central region.

5. A method as claimed in claim 1 comprising heat treating the parts at least after one of the welding steps.

6. A method as claimed in claim 5 wherein the heat treating is effected at an annealing temperature.

7. A method as claimed in claim 5 wherein said parts are made of steel.

8. A method as claimed in claim 1 wherein said parts are solid and of a relatively large diameter of at least 800mm.

9. A method as claimed in claim 8 wherein said diameter of the parts is at least 1000mm.

* * * * *